June 5, 1956 — J. F. EMERSON — 2,749,506
MAGNETOMETER
Filed Aug. 21, 1950 — 3 Sheets-Sheet 1

INVENTOR.
JOHN F. EMERSON
BY
ATTORNEY

June 5, 1956  J. F. EMERSON  2,749,506
MAGNETOMETER

Filed Aug. 21, 1950  3 Sheets-Sheet 2

INVENTOR.
JOHN F. EMERSON
BY

ATTORNEY

June 5, 1956  J. F. EMERSON  2,749,506
MAGNETOMETER

Filed Aug. 21, 1950  3 Sheets-Sheet 3

INVENTOR.
JOHN F. EMERSON
BY
ATTORNEY

United States Patent Office 2,749,506
Patented June 5, 1956

2,749,506

MAGNETOMETER

John F. Emerson, Hasbrouck Heights, N. J., assignor to Bendix Aviation Corporation, Teterboro, N. J., a corporation of Delaware Application August 21, 1950, Serial No. 180,572

26 Claims. (Cl. 324—43)

The invention relates to magnetometers and has as an object to determine the strength and direction of a magnetic field.

Another object is to provide a device having a pickup and means for indicating the strength and direction of the component of the earth's magnetic field in the plane of the pickup and without orienting the pickup.

Another object is to provide a device having a pickup with a plurality of elements inclined to one another and positioned in a plane to detect components of the magnetic field parallel to the elements and to add the components vectorially to indicate the magnitude and direction of the magnetic field in the plane.

Another object is to provide a device which may be used as a compass.

The invention contemplates a plurality of pickup elements defining a plane and inclined to one another within the plane. Voltages corresponding to the components of the magnetic field parallel to the elements are induced in the elements and means is provided to add the voltages so as to obtain the vector sum of the components. The phase of the voltage sum is determined by the direction of the magnetic field and the magnitude of the voltage sum is determined by the strength of the magnetic field.

The foregoing and other objects and advantages of the invention will appear more fully hereinafter from a consideration of the detailed description which follows, taken together with the accompanying drawings wherein four embodiments of the invention are illustrated. It is to be expressly understood, however, that the drawings are for the purposes of illustration and description only, and are not to be construed as defining the limits of the invention.

In the drawings, Figure 1 is a schematic diagram showing a magnetometer constructed according to the invention.

Figure 1:
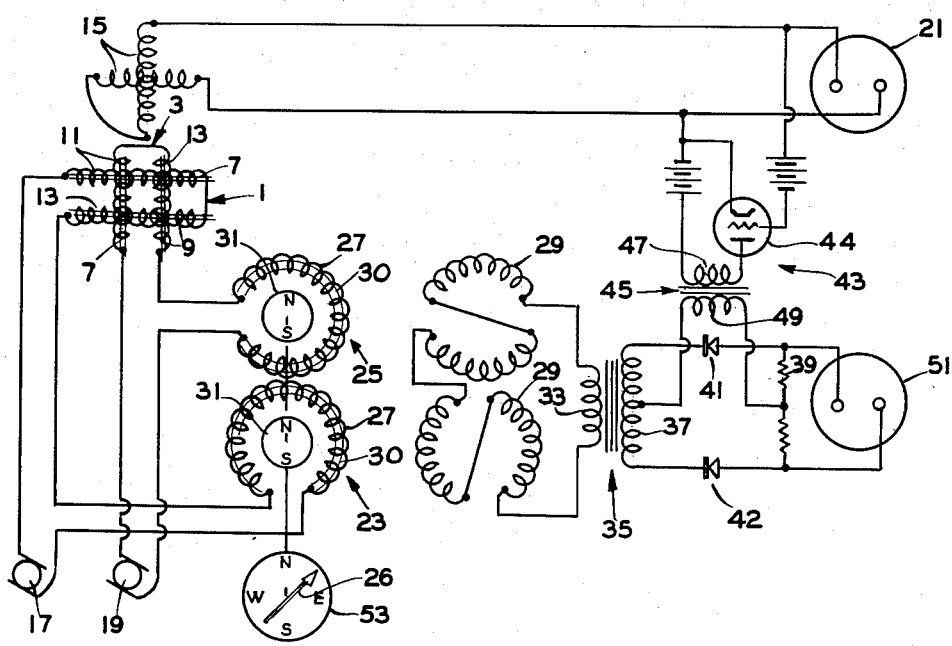

Referring now to the drawings for a more detailed description of the novel magnetometer of the present invention, the magnetometer shown schematically in Figure 1 includes a pickup having a pair of elements 1 and 3, and preferably is of the kind shown and described in co-pending application Serial No. 445,102, filed May 29, 1942, now abandoned, and a continuation of said application now Patent No. 2,710,942, by the present inventor and assigned to the same assignee as the present invention. The pickup elements define a plane and are positioned at right angles to one another. Each pickup element includes a pair of spaced parallel cores 7, 9 of saturable magnetically permeable material on which are wound separate exciting or energizing windings 11, 13 connected in series opposition. An output or secondary winding 15 is wound about both core members 7, 9 and about exciting windings 11, 13.

The exciting windings of pickup elements 1 and 3 are connected to alternating power sources 17 and 19, respectively, forty-five degrees out of phase with one another. Secondary windings 15 of pickup elements 1 and 3 are connected in series aiding relation to an A. C. voltmeter 21, which may be calibrated to indicate field strength. The signal voltage across the terminals of the voltmeter corresponds to the vector sum of the components of the magnetic field parallel to the pickup elements, that is, the amplitude of the voltage corresponds to the strength of the magnetic field in the plane of the pickup and the phase of the voltage corresponds to the direction of the magnetic field in the plane of the pickup.

To indicate the direction of the magnetic field, the phase of the voltage across the terminals of the voltmeter is referred to the phase of the sum of the voltages of the source and the phase shift, from a predetermined phase relation corresponding to a predetermined relation of the pickup and magnetic field, corresponds to the change of direction of the pickup relative to the field.

A pair of inductive devices 23, 25 each has a primary winding 27 and a secondary winding 29 wound on a saturable magnetically permeable core 30, and a permanent magnet rotor 31. The primary windings 27 of inductive devices 23, 25 are connected in series with the exciting windings of pickup elements 1, 3 to sources 17, 19, respectively. Rotors 31 of devices 23, 25 are coupled together and to a pointer 26 so that the field of the primary winding 27 of one device is normal to the field of its rotor when the field of the primary winding of the other device is parallel to the field of its rotor. The voltages induced in secondary windings 29 are 90° out of phase with one another. Secondary windings 29 of devices 23, 25 are connected in series across a primary winding 33 of a transformer 35 and provide a reference voltage. The center-tapped secondary winding 37 of transformer 35 forms two legs of a phase-sensitive bridge circuit. The other two legs of the bridge are formed by a center-tapped resistor 39. Rectifiers 41, 42 are connected in series with secondary winding 37 and resistor 39.

The voltage across the terminals of voltmeter 21 is amplified by an amplifier 43 having a tube 44 and a transformer 45 with its primary 47 connected in the plate circuit of the tube and its secondary 49 connected to the center-taps on secondary winding 37 and resistor 39. A D. C. ammeter 51 is connected across resistor 39.

The phase of the reference voltage relative to the signal voltage may be changed by rotating rotors 31. When the amplified voltage across the terminals of voltmeter 21 applied between the center taps of transformer winding 37 and resistor 39 is ninety degrees out of phase relative to the phase of the reference voltage, opposite ends of resistor 39 will be at the same D. C. potential, and ammeter 51 will have zero deflection. This condition is attained by rotating pointer 26 and rotors 31 of devices 23, 25 until the ammeter shows zero deflection, whereupon the direction of the field may be read on a scale 53 associated with pointer 26. One hundred eighty degree ambiguity may be avoided by polarizing the various electrical components so that for correct indication of the direction of the magnetic field, clockwise rotation of pointer 26 produces right-hand deflection of ammeter 51.

The instantaneous voltage $e_1$ induced in the secondary winding of pickup element 1 is $$e_1 = E_1 \sin 2 wt \qquad (1)$$

where $E_1$ = peak value of voltage
$w = 2\pi f$ (where $f$ is the frequency of the exciting voltage)
$t$ = time from initial starting point when the instantaneous current $i_1$ in the exciting windings is $$i_1 = I_1 \cos wt \tag{2}$$

Now is it known that $$E_1 = kh_1 \tag{3}$$

where $k$ is a coefficient of proportionality and $h_1$ is the strength of the component of the magnetic field parallel to the axis of pickup element 1 and $$h_1 = H \cos A \tag{4}$$

where $H$ is the field strength in the plane of the pickup and $A$ is the angle between the direction of the field and pickup element 1.

Substituting Equation 4 in Equation 1 and dropping the coefficient of proportionality $k$ $$e_1 = H \cos A \sin 2 wt \tag{5}$$

The instantaneous voltage $e_3$ induced in the secondary winding of pickup element 3 is $$e_3 = E_3 \sin (2 wt + 90°) \tag{6}$$

when the instantaneous current in the exciting winding is $$i_3 = I_3 \cos (wt + 45°) \tag{7}$$

Since pickup element 3 is a right angles to pickup element 1, the component of the magnetic field $h_3$ parallel to the axis of pickup element 3 is $$h_3 = H \cos (A - 90°) = H \sin A \tag{8}$$

Since $E_3 = kh_3$, by substituting Equation 8 in Equation 6 and dropping the coefficient of proportionality $k$ $$e_3 = H \sin A \sin (2 wt + 90°) \tag{9}$$

and $$e_3 = H \sin A \cos 2 wt \tag{10}$$

Since the secondary windings of pickup elements 1 and 3 are connected in series, the algebric sum of the voltage is $$e = e_1 + e_3 = H \cos A \sin 2 wt + H \sin A \cos 2 wt \tag{11}$$
$$= H \sin (A + 2 wt) \tag{12}$$

For peak value voltage E, $$\sin (A + 2 wt) = 1 \text{ and } E = H \tag{13}$$

Thus, the amplitude of the sum of the second harmonic peak voltages induced in secondary windings 15 of pickup elements 1 and 3 is proportional to the field strength in the plane of the pickup and is independent of the direction of the field relative to the pickup. The angle A determines the phase of the voltage and this relationship is utilized to determine the direction of the magnetic field.

Figure 2:
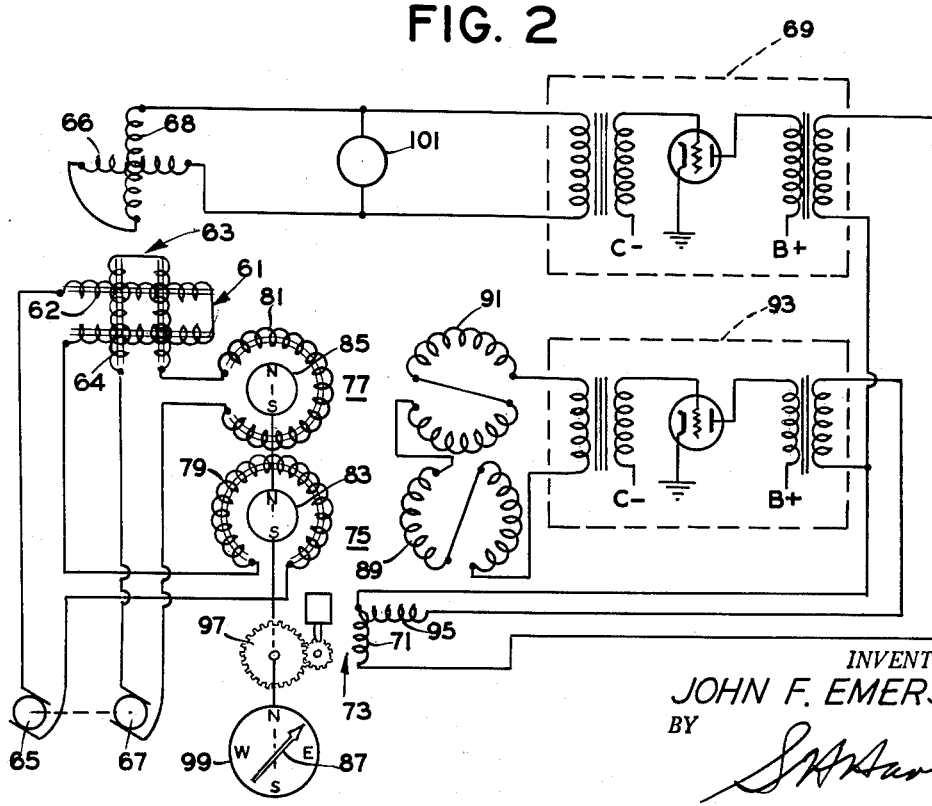
Figure 2 is a schematic diagram of a follow-up type magnetometer constructed according to the invention, and which may be used as a compass.

The magnetometer shown in Figure 2 includes a pickup having elements 61, 63 having their primary windings 62, 64 excited by alternating power sources 65, 67, respectively, forty-five degrees out of phase with one another. The voltages induced in the secondary windings 66, 68 of pickup elements 61, 63 are amplified by a conventional amplifier 69 and excite one phase winding 71 of a two-phase reversible motor 73. A pair of inductive devices 75, 77 have their primary windings 79, 81 connected to sources 65, 67, respectively, and the rotors 83, 85 of inductive devices 75, 77 are coupled together and to a pointer 87 in the manner corresponding to the rotors of devices 23, 25 of Figure 1. The voltages induced in secondary windings 89, 91 of inductive devices 75, 77 are amplified by a conventional amplifier 93 and excite a second phase winding 95 of motor 73. Motor 73 is drivingly connected through gearing 97 to rotors 83, 85 and pointer 87. Motor 73 drives rotors 83, 85 until the amplified voltages from pickup elements 61, 63 and inductive devices 75, 77 are in phase with one another whereupon the motor stops and pointer 87 indicates on scale 99 associated therewith the direction of the magnetic field.

The strength of the magnetic field is indicated on an a. c. voltmeter 101 connected across the secondary windings 66, 68 of pickup elements 61, 63.

Figure 3:
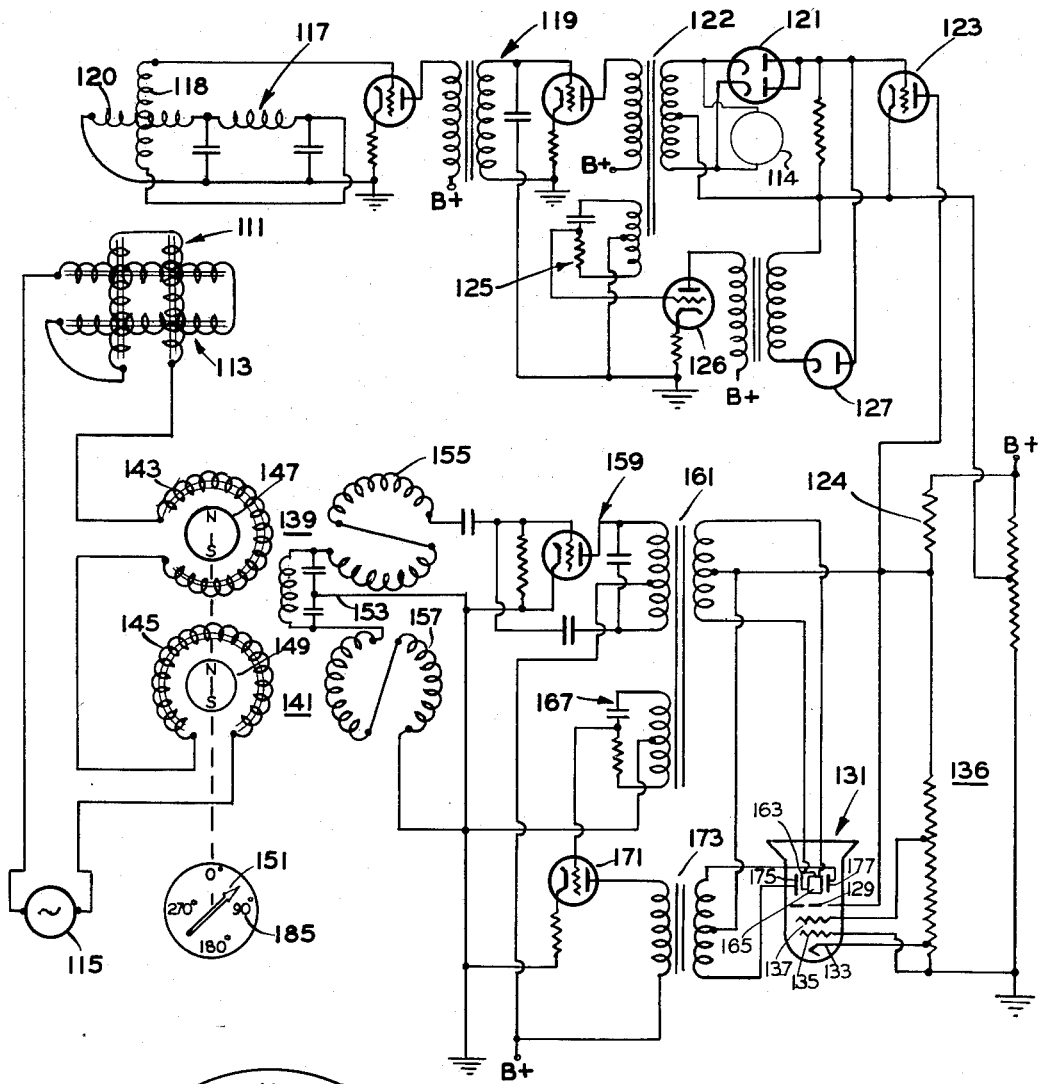
Figure 3 is a schematic diagram showing a magnetometer constructed according to the invention and using a cathode ray indicator.

The magnetometer shown in Figure 3 includes a pickup having elements 111, 113 excited by a single alternating power source 115. A phase-shifting circuit 117 is connected electrically to the secondary winding 120 of pickup element 113 so that the voltage induced in secondary winding 120 is shifted in phase ninety degrees relative to the voltage induced in secondary winding 118 of pickup element 111. The sum of the voltages induced in the secondary windings is amplified by a two-stage amplifier 119 and the output of the amplifier is applied through a transformer 122 to a full-wave rectifier 121. The output of amplifier 119 corresponds to the strength of the magnetic field and an indicator 114 may be connected across the secondary winding of transformer 122 to indicate the strength of the field. The output of rectifier 121 maintains vacuum tube 123 at cutoff, except when the instantaneous applied voltage is substantially zero, that is, for two pulses each cycle. To suppress one of the pulses, the output of amplifier 119 is fed through transformer 122 to a ninety degree phase-shifting circuit 125, amplified at 126, and rectified by a half-wave rectifier 127. The output of half-wave rectifier 127 is combined with the output of full-wave rectifier 121 so that tube 123 passes a current pulse only once during each cycle. The current pulses from tube 123 produce voltage pulses across resistor 124 which are impressed on the high voltage anode 129 of a cathode ray tube 131. The required voltages for the cathode 133, control grid 135 and accelerating electrode 137 are supplied from a voltage divider 136 for the reason set forth below.

Figure 4:
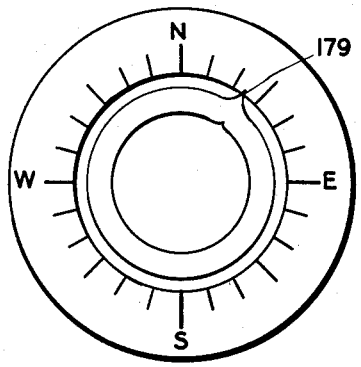
Figure 4 shows the pattern on the cathode ray tube for indicating direction.
Figure 4:

A pair of inductive devices 139, 141 have their primary windings 143, 145 connected in series with the exciting windings of pickup elements 111, 113 to source 115, and the rotors 147, 149 of inductive devices 139, 141 are coupled together and to a pointer 151 in a manner corresponding to the rotors of devices 23, 25 of Figure 1. A phase-shifting circuit 153 is connected electrically to the secondary winding 157 of inductive device 141 so that the voltage induced in the secondary winding 157 is shifted in phase ninety degrees relative to the voltage induced in the secondary winding 155 of inductive device 139 without change in amplitude. The combined outputs of secondary windings 155, 157 are fed to an oscillator 159 to obtain a substantially pure sine wave voltage and the output of the oscillator is fed through a transformer 161 to the deflecting plates 163, 165 of cathode ray tube 131. The output of oscillator 159 is also fed through transformer 161 to a phase-shifting circuit 167 which provides a sine wave voltage ninety degrees out of phase with the voltage impressed on deflecting plates 163, 165, and the voltage from the phase-shifting circuit 167 is amplified by an amplifier 171 and applied through a transformer 173 to deflecting plates 175, 177 of cathode ray tube 131. The voltages applied to deflecting plates 163, 165, 175, 177 produce a circular motion of the cathode ray beam, and the pulse voltage from tube 123 provides a pointer 179, as shown in Figure 4, which indicates the direction of the magnetic field. Voltage divider 136 is provided to maintain the spot in focus on the screen of the cathode ray tube irrespective of voltage variations.

The voltages applied to the deflecting plates of the cathode ray tube are controlled by the output of the inductive devices and their phases relative to the pulses from tube 123 can be varied by rotating rotors 147, 149 and pointer 151. If the variation is set off on a scale 185 associated with pointer 151, the indicated heading may be corrected because the pointer of the cathode ray beam will shift relative to the modulating pulses from tube 123.

In the foregoing arrangement, the phase of the output voltage of one of the pickup elements is shifted ninety degrees relative to the phase of the output voltage of the other pickup element, and this arrangement satisfies Equation 12.

Figure 5:
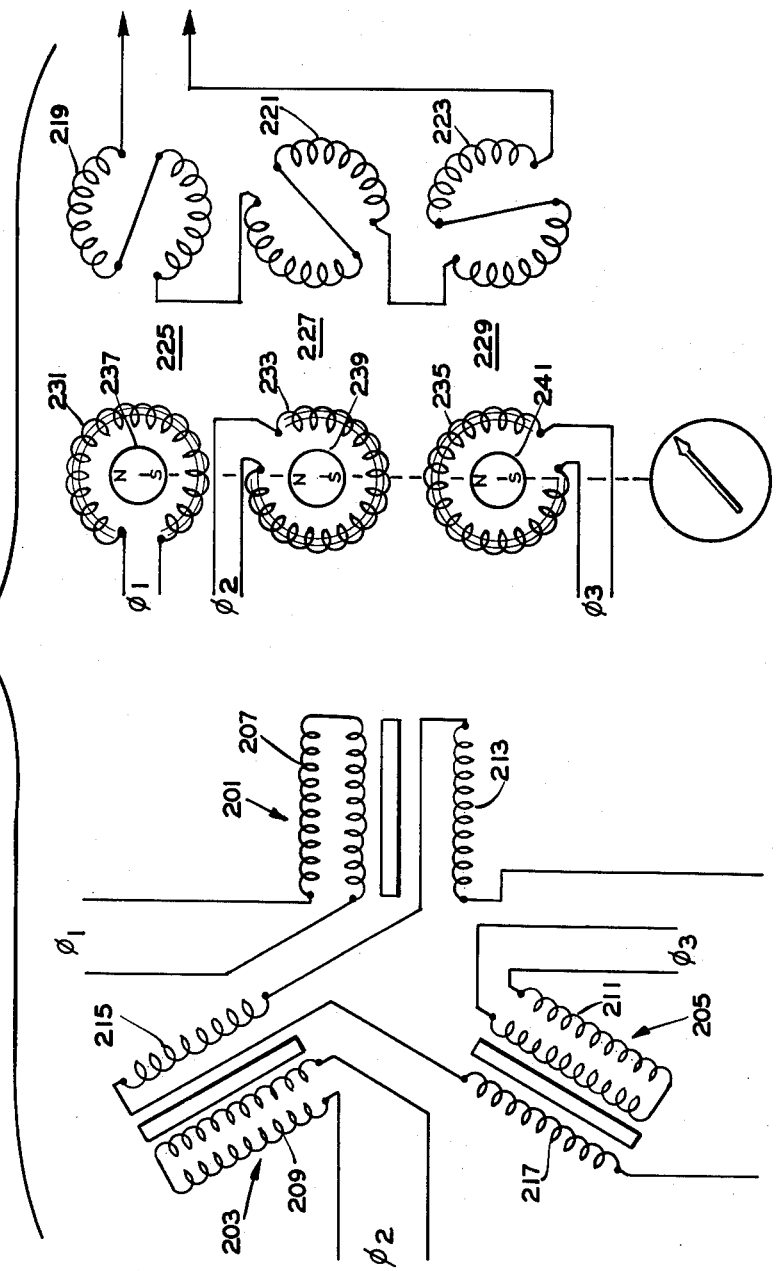
Figure 5 is a schematic diagram showing a modification of the circuits of Figures 1 to 3.

In Figure 5, a plurality of pickup elements 201, 203, 205, similar to elements 1, 3 of Figure 1, are disposed with their axes inclined at an angle of one hundred twenty degrees to one another. The exciting windings 207, 209, 211 of elements 201, 203, 205 are excited by the several phases $\phi 1$, $\phi 2$, $\phi 3$ of a three-phase alternating current source and the secondary windings 213, 215, 217 are connected in series with one another. The voltages induced in the secondary windings may be applied to a phase sensitive bridge, as shown in Figure 1, or to one phase of a two-phase motor as shown in Figure 2, or to the network shown in Figure 3.

In any event, the phase of the output of the pickup is compared with the phases of the voltages induced in the series connected secondary windings 219, 221, 223 of inductive devices 225, 227, 229, similar to devices 23, 25 of Figure 1, having their primary windings 231, 233, 235 connected to the several phases $\phi 1$, $\phi 2$, $\phi 3$ of the three-phase power source. The rotors 237, 239, 241 of inductive devices 225, 227, 229 are coupled together so that the fields of the primary windings 231, 233, 235 are disposed at an angle of one hundred twenty degrees to one another when the rotor fields are aligned with one another, as indicated in Figure 5.

According to Equation 5 above, the instantaneous voltage induced in the secondary winding 213 of pickup element 201 is $$e_{201} = H \cos A \sin 2wt \qquad (14)$$

Likewise, the instantaneous voltage induced in the secondary winding 215 of pickup element 203 is $$e_{203} = H \cos (A - 120°) \sin (2wt - 120°) \qquad (15)$$

Also, the voltage induced in the secondary winding 217 of pickup element 205 is $$e_{205} = H \cos (A - 240°) \sin (2wt - 240°) \qquad (16)$$

Since the secondary windings of pickup elements 201, 203, 205 are connected in series, the algebraic sum of the voltages induced therein is $$e = e_{201} + e_{203} + e_{205} \qquad (17)$$
$$= 3/2 H \sin (A + 2wt)$$

Thus, the amplitude of the sum of the second harmonic peak voltages induced in secondary windings 213, 215, 217 of pickup elements 201, 203, 205 is proportional to the field strength and the angle A determines the phase of the voltage, and this relationship is utilized to determine the direction of the magnetic field by comparing it to the phase of the reference voltages of the inductive devices.

It should be understood that the manner of obtaining the signal voltage corresponding to the magnetic field and the reference voltage using separate alternating current sources forty-five degrees out of phase with one another may be applied to the cathode ray tube indication shown in Figure 3. Likewise, the arrangement for obtaining the signal and reference voltages utilizing the single phase power source, as shown in Figure 3, may be applied to the phase comparing circuits of Figures 1 and 2.

The magnetometers described indicate the strength and direction of the component of the earth's magnetic field in the plane of the pickup unit and without orienting the pickup unit, and each of the devices may be used as a compass.

Although but four embodiments of the invention have been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In a device of the kind described, a pickup having elements of magnetic material inclined to one another, windings associated with said elements and arranged so that upon energization thereof by varying current means, voltages corresponding to the components of an external unidirectional magnetic field parallel to the associated elements are induced therein, means to combine the voltages induced in said windings to procure a voltage corresponding in phase and amplitude to the vector sum of the magnetic field components, and means responsive to said latter voltage to indicate the strength of the magnetic field.

2. In a device of the kind described, a pickup having elements of magnetic material inclined to one another and defining a plane, windings associated with said elements and arranged so that upon energization thereof by varying current means, voltages corresponding to the components of an external unidirectional magnetic field parallel to the associated elements are induced therein, means to combine the voltages induced in said windings to procure a voltage corresponding in phase and amplitude to the direction and strength of the magnetic field parallel to the plane of the pickup, and means responsive to said latter voltage to indicate the strength of the magnetic field.

3. In a device of the kind described, a pickup having elements of magnetic material inclined to one another, windings associated with said elements for magnetizing said elements and arranged so that upon energization thereof by varying current means, voltages corresponding to the components of an external unidirectional magnetic field parallel to the associated elements are induced therein, means to combine the voltages induced in said windings to procure a signal voltage corresponding in phase and amplitude to the direction and strength of the magnetic field, means to compare the phase of said signal voltage relative to a reference voltage to determine the direction of the magnetic field, and means responsive to the amplitude of said signal voltage to determine the strength of the magnetic field.

4. In a device of the kind described, a pickup having elements of magnetic material inclined to one another, windings associated with said elements and arranged so that upon energization thereof by varying current means, voltages corresponding to the components of an external unidirectional magnetic field parallel to the associated elements are induced therein, and means to combine the voltages to procure a signal voltage corresponding in phase and amplitude to the direction and strength of the magnetic field, inductive devices adapted to be energized in phase with said pickup element windings and connected to provide a reference voltage, and means to compare the phases of said reference voltage and said signal voltage to determine the direction of the magnetic field.

5. In a device of the kind described including voltage source means, a pickup connected to said voltage source means and having elements of magnetic material inclined to one another, windings associated with said elements and arranged so that upon energization thereof by varying current means, voltages corresponding to the components of an external uni-directional magnetic field parallel to the associated elements are induced therein, and means to combine the voltages to procure a signal voltage corresponding in phase and amplitude to the direction and strength of the magnetic field, inductive devices including primary windings adapted to be energized in phase with said pickup element windings and having secondary windings connected to provide a reference voltage, said inductive devices having permanent magnet rotors for changing the phase of the reference voltage relative to the signal voltage, and means coupling the reference voltage and signal voltage outputs to compare the phases of said reference voltage and said signal voltage so that upon rotation of said rotors, a predetermined phase relation between said reference voltage and said signal voltage may be detected.

6. In a device for indicating the strength of a magnetic field, a pickup having elements of magnetic material inclined ninety degrees to one another, exciting windings associated with said elements and adapted to be energized by alternating currents forty-five degrees out of phase with one another, a secondary winding associated with each of said elements and adapted to have induced therein a voltage corresponding to the component of the magnetic field parallel to the associated element, said secondary windings being connected in series with one another to provide a voltage corresponding to the strength of the magnetic field and voltage responsive means connected across said secondary windings to indicate the strength of the magnetic field.

7. In a device of the kind described including voltage source means, a pickup connected to said voltage source means and having a pair of elements of magnetic material inclined ninety degrees to one another, windings associated with said elements and adapted to be energized by said voltage source means forty-five degrees out of phase with one another and arranged so that voltages corresponding to the components of an external unidirectional magnetic field parallel to the associated elements are induced in the windings, means to combine the voltages induced in said windings to procure a signal voltage corresponding in phase to the direction of the magnetic field, a pair of inductive devices adapted to be connected directly to said voltage source means and providing a reference voltage, means for changing the phase of the reference voltage relative to the signal voltage, and means to detect a predetermined phase relationship between said signal voltage and said reference voltage to determine the direction of the magnetic field.

8. In a device of the kind described, a pickup having elements of magnetic material inclined ninety degrees to one another, exciting windings associated with said elements and adapted to be energized by alternating current sources forty-five degrees out of phase with one another, a secondary winding associated with each of said elements and adapted to have induced therein a voltage corresponding to the component of the magnetic field parallel to the associated element, said secondary windings being connected in series with one another to provide the algebraic sum of the voltages induced therein to procure a signal voltage corresponding in phase to the direction of the magnetic field, a pair of inductive devices having primary windings adapted to be energized by the alternating current sources and having secondary windings connected in series with one another to provide a reference voltage, said inductive devices having permanent magnet rotors coupled together and arranged so that the field of the primary winding of one inductive device is normal to the field of its rotor when the field of the primary winding of the other device is parallel to the field of its rotor, said rotors being arranged so that when rotated, the phase of the reference voltage changes relative to the phase of the signal voltage, and means to detect a predetermined phase relation between the reference voltage and the signal voltage upon rotation of said rotor.

9. Structure as described in claim 8 including voltage responsive means connected across the secondary windings of said pickup elements and arranged to indicate the strength of the magnetic field.

10. In a device of the kind described including voltage source means, a pickup connected to said voltage source means and having elements of magnetic material inclined to one another, windings associated with said elements and arranged so that upon energization thereof by said voltage source means, voltages corresponding to the components of an external unidirectional magnetic field parallel to the associated elements are induced therein, means to combine the voltages to procure a signal voltage corresponding in phase to the direction of the magnetic field, inductive devices including primary windings adapted to be energized in phase with said pickup element windings and having secondary windings connected to provide a reference voltage, said inductive devices having permanent magnet rotors for changing the phase of the reference voltage relative to the signal voltage, and a reversible two-phase motor drivingly associated with said rotors and having one of its phase windings responsive to the signal voltage and having the other of its phase windings responsive to the reference voltage, said motor driving said rotors to a position in which the voltages energizing the phase windings are in phase with one another.

11. Structure as described in claim 10 which includes an indicator associated with the rotors for indicating the direction of the magnetic field.

12. In a device of the kind described, a pickup having a pair of elements of magnetic material inclined ninety degrees to one another, windings associated with said elements and adapted to be energized by alternating current sources forty-five degrees out of phase with one another and arranged so that voltages corresponding to the components of an external unidirectional magnetic field parallel to the associated elements are induced in the windings, means to add the voltages induced in said windings algebraically to procure a signal voltage corresponding in phase to the direction of the magnetic field, a pair of inductive devices adapted to be connected to the alternating current sources and providing a reference voltage, means for changing the phase of the reference voltage relative to the signal voltage, and a reversible two-phase motor drivingly associated with said last-mentioned means and having one of its field windings responsive to the signal voltage and the other of its field windings responsive to the reference voltage, and said motor driving said last-mentioned means to a position in which the voltages energizing the field windings are in phase with one another.

13. In a device of the kind described including voltage source means, a pickup connected to said voltage source means and having elements of magnetic material inclined to one another, windings associated with said elements and arranged so that upon energization thereof by varying current means, voltages corresponding to the components of an external unidirectional magnetic field parallel to the associated elements are induced therein, and means to combine the voltages to procure a signal voltage corresponding to phase to the direction of the magnetic field, inductive devices connected to said voltage source means and adapted to be energized in phase with said pickup element and providing a reference voltage, means for changing the phase of the reference voltage relative to the signal voltage, and a reversible two-phase motor drivingly coupled with said last-mentioned means and having one of its windings responsive to the signal voltage and the other of its windings responsive to the reference voltage, said motor driving said last mentioned means to a position in which the voltages energizing the field windings are in phase with one another.

14. In a device of the kind described, a pickup having elements of magnetic material inclined to one another, windings associated with said elements and arranged so that upon energization thereof, voltages corresponding to the components of an external unidirectional magnetic field parallel to the associated elements are induced therein, means to combine the voltages induced in said windings to procure a signal voltage corresponding in phase to the direction of the magnetic field, inductive devices adapted to be energized in phase with said pickup windings and providing a reference voltage, means responsive to the signal voltage for producing a pulse voltage, and a cathode ray tube responsive to the pulse voltage and to the reference voltage and adapted to indicate the direction of the magnetic field.

15. In a device of the kind described, a pickup having elements of magnetic material inclined to one another, windings associated with said elements and arranged so that upon energization thereof, voltages corresponding to the components of an external unidirectional magnetic field parallel to the associated elements are induced therein, and means to combine the voltages induced in said windings to procure a signal voltage corresponding in phase to the direction of the magnetic field, a full-wave rectifier for rectifying said signal voltage, phase-shifting means responsive to said signal voltage and shifting the phase of said signal voltage ninety degrees, a half-wave rectifier for rectifying said phase-shifted signal voltage, and a vacuum tube responsive to the outputs of said full-wave rectifier and said half-wave rectifier and providing a voltage with a single pulse each cycle determined by the phase of the signal voltage, inductive devices adapted to be energized in phase with said pickup windings and providing a reference voltage, and a cathode ray tube responsive to the pulse voltage and to the reference voltage and adapted to indicate the direction of the magnetic field.

16. In a device of the kind described, a pickup having elements of magnetic material inclined ninety degrees to one another, windings associated with said elements and adapted to be energized by a single-phase alternating current source and arranged so that voltages corresponding to the components of an external unidirectional magnetic field parallel to the associated elements are induced in the windings, means for shifting the voltage induced in one of said windings through an angle of ninety degrees relative to the voltage induced in another of said windings, and means to combine the phase-shifted voltage and the other induced voltage to procure a signal voltage corresponding in amplitude to the strength of the magnetic field.

17. Structure as described in claim 16 which includes an indicator responsive to the signal voltage for indicating the strength of the magnetic field.

18. In a device of the kind described, a pickup having elements of magnetic material inclined ninety degrees to one another, windings associated with said elements and adapted to be energized by a single-phase alternating current source and arranged so that voltages corresponding to the components of an external unidirectional magnetic field parallel to the associated elements are induced in the windings, means for shifting the phase of the voltage induced in one of said windings through an angle of ninety degrees relative to the phase of the voltage induced in another of said windings, means to combine the phase-shifted voltage and the other induced voltage to procure a signal voltage corresponding in phase to the direction of the magnetic field, a pair of inductive devices adapted to be connected to the alternating current source, a phrase-shifting circuit associated with one of said inductive devices for shifting the voltage induced therein ninety degrees relative to the voltage induced in the other inductive device, means to add the latter voltages algebraically to provide a reference voltage, and means to compare the phase of said signal voltage relative to said reference voltage to determine the direction of the magnetic field.

19. In a device of the kind described, a pickup having elements of magnetic material inclined ninety degrees to one another, exciting windings associated with said elements and connected in series and adapted to be energized by a single phase alternating current source, a secondary winding associated with each of said elements and adapted to have induced therein a voltage corresponding to the component of a unidirectional magnetic field parallel to the associated element, a phase-shifting circuit associated with one of said secondary windings and adapted to shift the phase of the voltage induced in said secondary winding ninety degrees relative to the phase of the voltage induced in the other secondary winding, said windings being connected to combine the phase-shifted voltage and the other induced voltage to procure a signal voltage corresponding in phase to the direction of the magnetic field, a pair of inductive devices having primary windings adapted to be energized by the alternating current source and having secondary windings, a phase-shifting circuit associated with one of said last-mentioned secondary windings to shift the phase of the voltage induced therein ninety degrees relative to the phase of the voltage induced in the other of the secondary windings, said secondary windings being connected in series with one another to procure a reference voltage, said inductive devices having permanent magnet rotors coupled together and arranged so that the field of the primary winding of one inductive device is normal to the field of its rotor, and the field of the primary winding of the other device is parallel to the field of its rotor, said rotors being arranged so that when rotated, the phase of the reference voltage changes relative to the phase of the signal voltage, and means to detect a predetermined phase relation between the reference voltage and the signal voltage upon rotation of said rotor.

20. In a device of the kind described, a pickup having three elements of magnetic material inclined one hundred twenty degrees to one another, windings associated with said elements and adapted to be energized by a three-phase alternating current source and arranged so that voltages corresponding to the components of an external unidirectional magnetic field parallel to the associated elements are induced in the windings, and means to combine the voltages induced in said windings to procure a signal voltage corresponding to the vector sum of the magnetic field components.

21. Structure as described in claim 20 including indicating means responsive to the amplitude of the signal voltage and calibrated to indicate the strength of the magnetic field.

22. Structure as described in claim 20 for comparing the phase of the signal voltage with a reference voltage and indicating the direction of the magnetic field.

23. In a device of the kind described, a pickup having three elements of magnetic material inclined one hundred twenty degrees to one another, exciting windings associated with said elements and adapted to be energized by a three-phase alternating current source, a secondary winding associated with each of said elements and adapted to have induced therein a voltage corresponding to the component of an external unidirectional magnetic field parallel to the associated element, said secondary windings being connected in series with one another to provide a voltage corresponding to the strength of the magnetic field.

24. In a device of the kind described, a pickup having three elements of magnetic material inclined one hundred twenty degrees to one another, windings associated with said elements and adapted to be energized by a three-phase alternating current source and arranged so that voltages corresponding to the component of an external unidirectional magnetic field parallel to the associated elements are induced in the windings, means to combine the voltages induced in said windings to procure a signal voltage corresponding in phase to the direction of the magnetic field, three inductive devices adapted to be connected to the current source and connected together to provide a reference voltage, means for changing the phase of the reference voltage relative to the signal voltage, and means to detect a predetermined phase relationship between said signal voltage and said reference voltage to determine the direction of the magnetic field.

25. In a device of the kind described, a pickup having three elements of magnetic material inclined one hundred twenty degrees to one another, exciting windings associated with said elements and adapted to be energized by a three-phase alternating current source, a secondary winding associated with each of said elements and adapted to have induced therein a voltage corresponding to the component of an external unidirectional magnetic field parallel to the associated element, said secondary windings being connected in series with one another to combine the voltages induced therein to procure a voltage corresponding in phase to the direction of the magnetic field, three inductive devices including primary windings adapted to be energized by the three-phase alternating current source and having secondary windings connected in series with one another to provide a reference voltage, said inductive devices having permanent magnet rotors coupled together and arranged so that the fields of the primary windings of the inductive devices are disposed at an angle of one hundred twenty degrees to one another when the rotor fields are aligned with one another, said rotors being arranged so that when rotated, the phase of the reference voltage changes relative to the phase of the signal voltage, and means to compare the phases of said reference voltage and said signal voltage to determine the direction of the external magnetic field.

26. In a device of the class described, a pickup having elements of magnetic material positioned at an angle to one another, windings on said elements, power means of varying amplitude for energizing said windings and inducing in said windings voltages corresponding to the components of an external uni-directional magnetic field parallel to the associated elements, means for combining the voltages induced in said windings to procure a voltage corresponding in phase and amplitude to the vector sum of the magnetic field components, and an indicator responsive to the latter voltage to indicate the strength of the magnetic field.

References Cited in the file of this patent
UNITED STATES PATENTS

| | | |
|---|---|---|
| 2,361,433 | Stuart | Oct. 31, 1944 |
| 2,427,666 | Felch | Sept. 23, 1947 |
| 2,435,276 | Holmes | Feb. 3, 1948 |
| 2,438,964 | Cunningham et al. | Apr. 6, 1948 |
| 2,485,931 | Slonczewski | Oct. 25, 1949 |